United States Patent
Misumi et al.

(10) Patent No.: US 7,782,006 B2
(45) Date of Patent: Aug. 24, 2010

(54) MOTOR CONTROLLING DEVICE

(75) Inventors: Takeshi Misumi, Wako (JP); Shinichiro Kobashi, Wako (JP)

(73) Assignee: Honda Motor Co., Ltd., Minato-ku, Tokyo (JP)

( * ) Notice: Subject to any disclaimer, the term of this patent is extended or adjusted under 35 U.S.C. 154(b) by 212 days.

(21) Appl. No.: 11/705,779

(22) Filed: Feb. 14, 2007

(65) Prior Publication Data

US 2007/0200515 A1    Aug. 30, 2007

(30) Foreign Application Priority Data

Feb. 14, 2006    (JP) ............... 2006-036607

(51) Int. Cl.
*H02P 8/00*    (2006.01)
(52) U.S. Cl. .................. 318/696; 318/373; 318/400.01
(58) Field of Classification Search ................ 318/696, 318/400.01, 373, 254, 568.2
See application file for complete search history.

(56) References Cited

U.S. PATENT DOCUMENTS

| | | | | |
|---|---|---|---|---|
| 4,816,726 | A * | 3/1989 | Novis et al. .................. 318/293 |
| 5,326,158 | A * | 7/1994 | Ohori et al. .................. 303/3 |
| 6,232,731 | B1 * | 5/2001 | Chapman .................... 318/801 |
| 6,253,733 | B1 * | 7/2001 | Marumoto et al. .......... 123/399 |
| 6,389,895 | B2 * | 5/2002 | Colarelli et al. ............. 73/462 |
| 6,486,632 | B2 * | 11/2002 | Okushima et al. ........... 318/599 |
| 6,518,723 | B2 * | 2/2003 | Oku .......................... 318/801 |
| 6,798,157 | B2 * | 9/2004 | Takahashi et al. ........ 318/400.21 |
| 6,856,106 | B2 * | 2/2005 | Bliley et al. .................. 318/34 |
| 2004/0206558 | A1 * | 10/2004 | Kabasawa et al. ........... 180/65.2 |
| 2005/0127860 | A1 * | 6/2005 | Jahkonen et al. ............ 318/254 |
| 2005/0184697 | A1 * | 8/2005 | Iribe et al. ............. 318/568.12 |

FOREIGN PATENT DOCUMENTS

JP    2004-135437    4/2004

* cited by examiner

*Primary Examiner*—Bentsu Ro
*Assistant Examiner*—David S Luo
(74) *Attorney, Agent, or Firm*—Squire, Sanders & Dempsey, LLP

(57) ABSTRACT

To provide a motor controlling device that reduces heat generated by an armature and switching elements when an alternating motor is activated. A motor controlling device includes: an H bridge circuit 20 that has FET1 to FET4 that connect and disconnect a high potential end HV and a low potential end GND of a direct-current power supply to and from an armature Lu; and an energization control unit for controlling the amount of energization of the armature Lu by the PWM control that involves changing the ratio, in a predetermined control cycle, between an energization control period, in which the FET1 and the FET2 are turned on and the FET3 and the FET4 are turned off, or the FET3 and the FET4 are turned on and the FET1 and the FET2 are turned off, and a non-energization control period, in which the FET1 and the FET3 are turned on and the FET2 and the FET4 are turned off, or the FET2 and the FET4 are turned on and the FET1 and the FET3 are turned off.

2 Claims, 9 Drawing Sheets

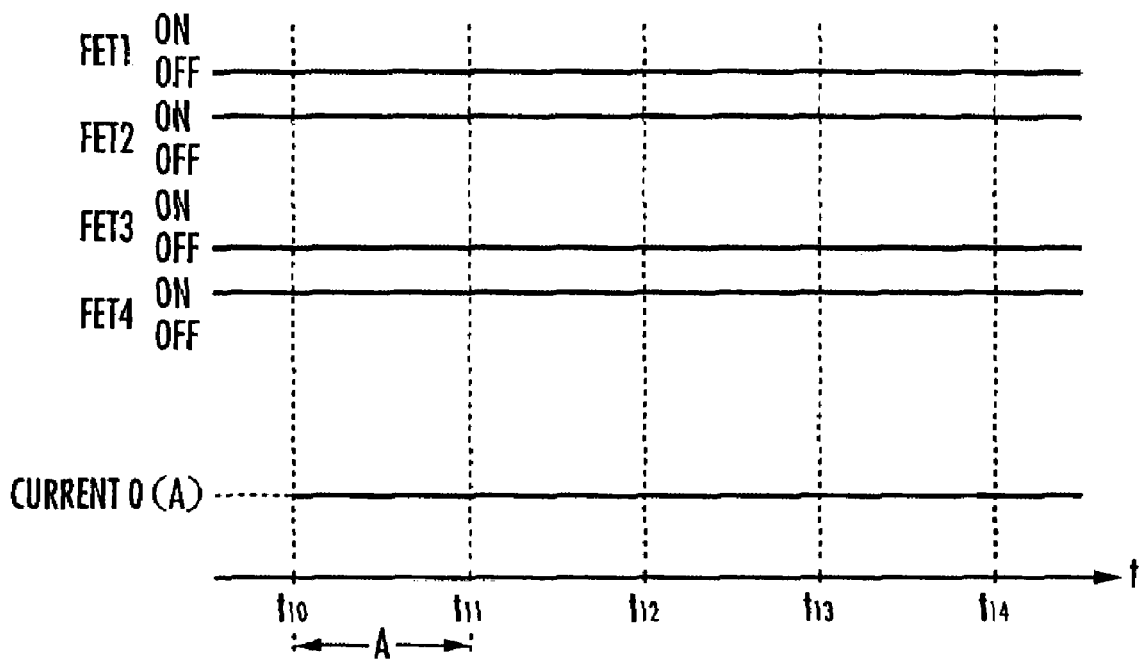
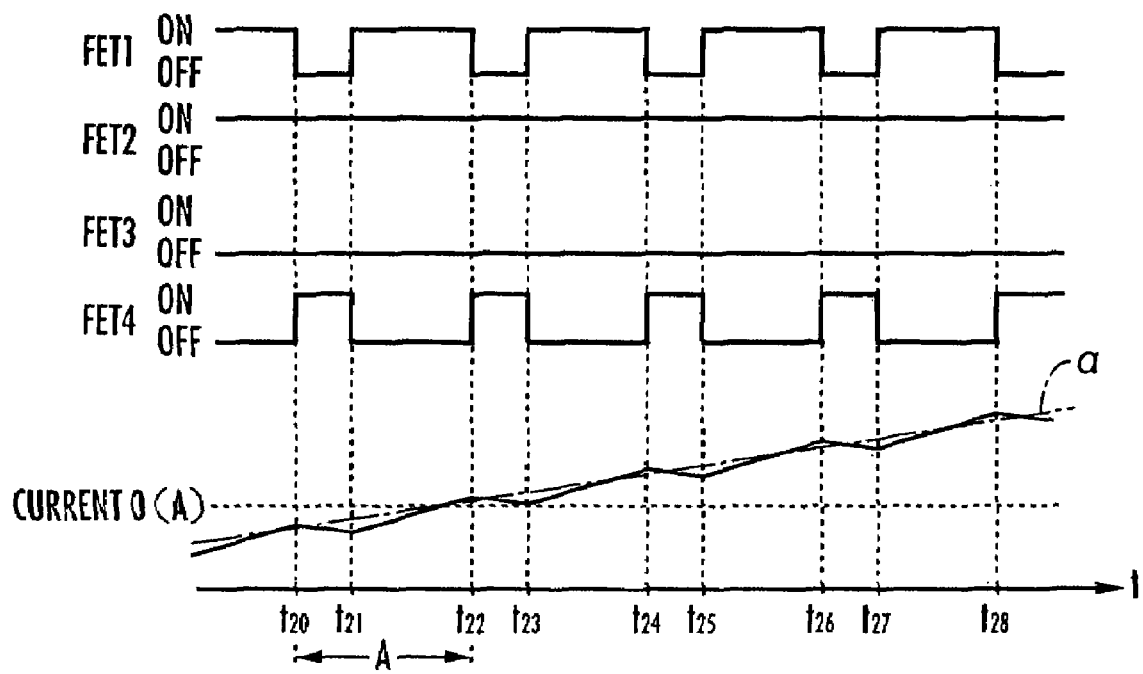

MOTOR CONTROLLING DEVICE

BACKGROUND OF THE INVENTION

1. Field of the Invention

The present invention relates to control of the amount of energization of an alternating-current motor. In particular, it relates to a motor controlling device that controls the amount of energization of an alternating-current motor by turning on and off switching elements forming an H bridge.

2. Description of the Related Art

Conventional motor controlling devices for a three-phase alternating-current motor, which is a typical alternating-current motor, are configured as shown in FIG. 7 and control the amount of energization of the three-phase alternating-current motor by supplying current command values balanced among the three phases (the U phase, the V phase and the W phase) to armatures 230, 231, 232. Specifically, a PWM circuit 241 and a base drive circuit 240 control the amount of energization by the PWM control that involves changing the ratio between the directions of energization of the armatures 230, 231 and 232 by a direct-current power supply 210 for each control cycle.

In this case, if the amount of energization of the U-phase armature 230 is 100% of the rated current, for example, the amount of energization of the V-phase armature 231 and the W-phase armature 232 is 50% of the rated current. Thus, compared with U-phase switching elements 220 and 221, V-phase switching elements 222 and 223 and W-phase switching elements 224 and 225 have a low current utilization ratio. In addition, when the rotational speed of the alternating-current motor 200 is low, a large current flows through the part of one phase for a long time, and therefore, there is a problem that the heat generated by the switching elements and armature increases.

Thus, as shown in FIG. 8, there has been proposed a motor controlling device that has H bridge circuits 310, 311 and 312 provided for three phase armatures 301, 302 and 303 of a three-phase alternating-current motor 300, respectively, which enable independent control of the amount of energization of each of the armatures 301, 302 and 303, and adds an offset current to the current command values balanced among the three phases in such a manner that the combined spatial vector for the three phases is zero (see Japanese Patent Laid-Open No. 2004-135437, p. 4-5, FIGS. 1 to 13, for example).

Since this motor controlling device adds the offset current, currents not balanced among the three phases can be supplied to the armatures 301, 302 and 303. Therefore, the motor controlling device can compensate for unbalanced amounts of energization of the armatures, thereby reducing the heat generated by the switching elements and the armatures described above. However, this motor controlling device is still based on the use of the current command values balanced among the three phases.

In the case where the amount of energization of each armature is PWM-controlled as described above by controlling the current command values balanced among the three phases, if the current command values are zero, FET1 to FET4 of the H bridge circuits 310, 311 and 312 are turned on or off as shown in FIG. 9(a) so that the average of the amounts of energization is zero.

In this case, the ratio between the directions of energization in each control cycle A ($t_{30}$-$t_{32}$, $t_{32}$-$t_{34}$, $t_{34}$-$t_{36}$, $t_{36}$-$t_{38}$) is 1:1 (duty=50%), and as shown at the bottom of FIG. 9(a), a wasted current shown by the shaded areas flows through the armatures 301, 302 and 303 of the alternating-current motor and the switching elements (FET1 to FET4) of the H bridge circuits 310, 311 and 312. Then, heat is generated in proportion to the square of the wasted current.

Furthermore, in the case where the current command values balanced among the three phases increase, as shown in FIG. 9(b), the average β of the amounts of energization increases, and a wasted current shown by the shaded areas at the bottom of FIG. 9(b) is consumed, and therefore, the armatures of the alternating-current motor and the switching elements of the H bridge circuits generate heat in proportion to the square of the wasted current. The same holds true for the case where the current command values balanced among the three phases decrease.

The present invention is devised in view of such circumstances, and an object of the present invention is to provide a motor controlling device that reduces heat generated by an armature and switching elements when an alternating motor is activated.

SUMMARY OF THE INVENTION

The present invention is devised in order to attain the object described above and relates to a motor controlling device that comprises: a direct-current power supply; an H bridge circuit that is provided between the direct-current power supply and each phase armature of an alternating-current motor and has a first switching element that connects and disconnects a high potential end of the direct-current power supply to and from one end of the armature, a second switching element that connects and disconnects a low potential end of the direct-current power supply to and from the other end of the armature, a third switching element that connects and disconnects the high potential end of the direct-current power supply to and from the other end of the armature and a fourth switching element that connects and disconnects the low potential end of the direct-current power supply to and from the one end of the armature; and energization control means for controlling the operation of the first to fourth switching elements of each H bridge circuit, thereby controlling the amount of energization of each armature.

The energization control means controls the amount of energization of each armature by the PWM control that involves changing the ratio, in a predetermined control cycle, between an energization control period, in which the first and second switching elements are turned on and the third and fourth switching elements are turned off in the associated H bridge circuit, or the third and fourth switching element are turned on and the first and second switching elements are turned off in the associated H bridge circuit, and a non-energization control period, in which the first and third switching elements are turned on and the second and fourth switching elements are turned off in the associated H bridge circuit, or the second and fourth switching elements are turned on and the first and third switching elements are turned off in the associated H bridge circuit.

According to the present invention, the H bridge circuit is provided for each phase armature of the alternating-current motor. Therefore, the energization control means can independently control the amount of energization of each armature by controlling the ON/OFF state of the switching elements of each H bridge circuit. Furthermore, the energization control means controls the amount of energization of each armature by the PWM control that involves changing the ratio between the energization control period and the non-energization control period. In the non-energization control period, the energization control means turns the first and third switching elements on and the second and fourth switching elements off to connect the both ends of the armature to the high potential end of the direct-current power supply or turns the second and fourth switching elements on and the first and third switching elements off to connect the both ends of the armature to the low potential end of the direct-current power supply. Thus, in the non-energization control period, the opposite ends of the armature are at the same potential, and the direct-current power supply does not energize the armature.

Therefore, unlike the case where the conventional motor controlling device described above that controls the amount of energization by the PWM control that involves changing the directions of energization of the armatures, useless energization of the armatures can be avoided. As a result, heat generation by the armatures and the switching elements due to such useless energization can be avoided, and the heat generated by the armatures and the switching elements when the alternating-current motor operates can be reduced.

Furthermore, the alternating-current motor is a joint motor for a leg of a legged walking robot, and the motor controlling device is housed in a housing of the legged walking robot along with the joint motor.

According to the present invention, the alternating-current motor used as a joint motor for a leg of a legged walking robot has to output a high torque to make a sequence of walking movements while maintaining a proper posture of the legged walking robot. To this end, the amount of energization of the armatures of the alternating-current motor increases. In addition, since the motor controlling device according to the present invention is housed in the housing of the legged walking robot along with the alternating-current motor, the heat generated by the alternating-current motor and the first to fourth switching elements of the H bridge circuits tends to be confined in the housing. Thus, the energization control means performs the PWM control to reduce the heat generated by the alternating-current motor and the first to fourth switching elements, thereby preventing degradation of the performance of the alternating-current motor and the first to fourth switching elements due to the temperature increase and thus degradation of the walking performance of the legged walking robot.

Furthermore, the motor controlling device is provided in a hybrid vehicle whose driving force is produced by an engine and the alternating-current motor, and the alternating-current motor is disposed on an output shaft of the engine at a position between the engine and a transmission and has a rotor coupled to the output shaft of the engine.

According to the present invention, the alternating-current motor is disposed between the engine and the transmission. Thus, air convection around the alternating-current motor is hard to occur. In addition, the heat generated by the engine is transferred to the alternating-current motor not only from the outside thereof but also from the inside thereof via the output shaft of the engine. As a result, the temperature of the alternating-current motor tends to increase. Thus, the energization control means performs the PWM control to reduce the heat generated by the alternating-current motor and the first to fourth switching elements, thereby preventing degradation of the performance of the alternating-current motor and the first to fourth switching elements due to the temperature increase and thus degradation of the running performance of the hybrid vehicle.

BRIEF DESCRIPTION OF THE DRAWINGS

FIG. 4 includes graphs for illustrating the amount of energization of the alternating-current motor under the PWM control;

DETAILED DESCRIPTION OF THE PREFERRED EMBODIMENTS

Figure 1:
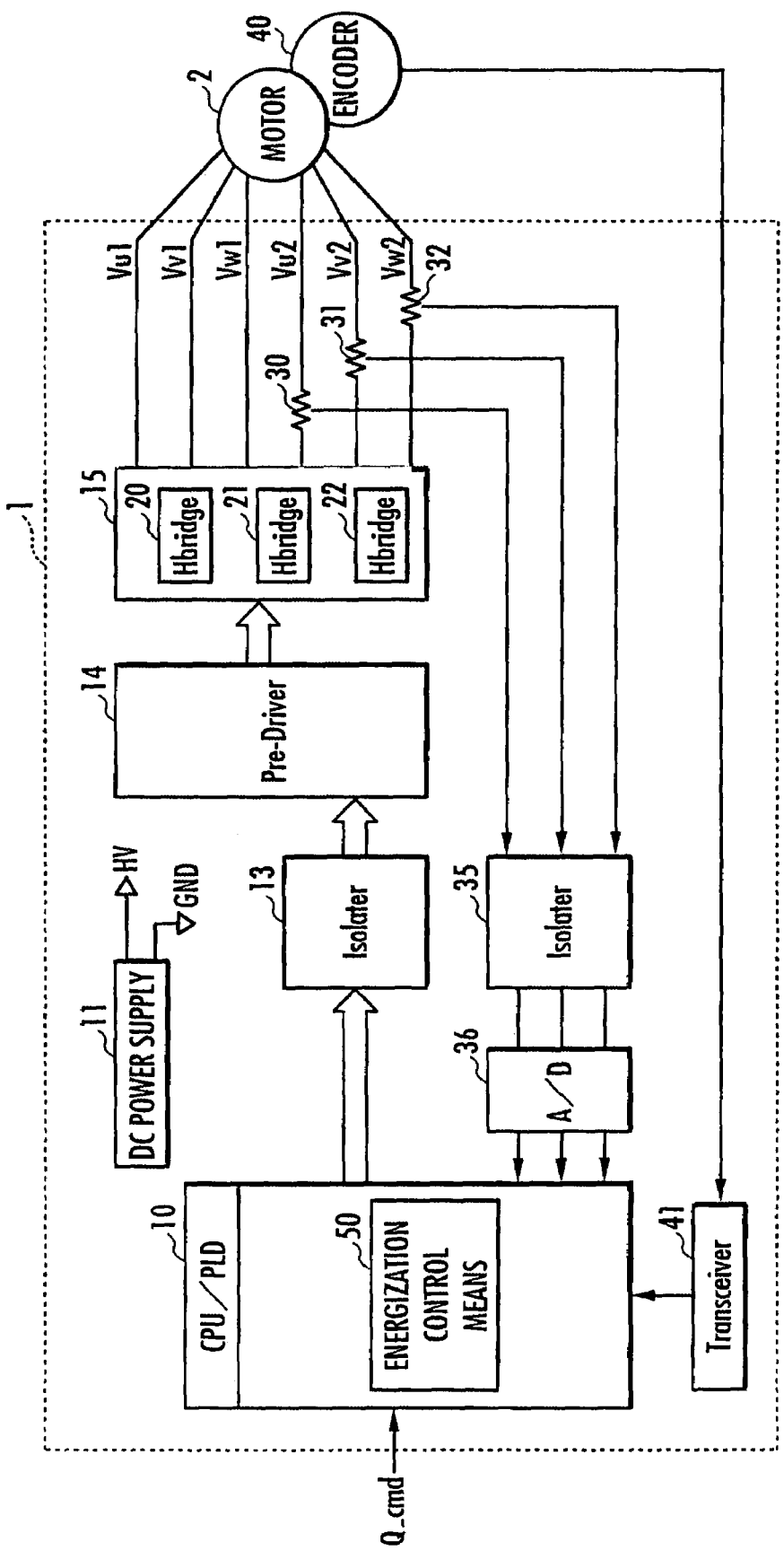
FIG. 1 is a diagram showing a configuration of a motor controlling device according to the present invention.
Figure 5:
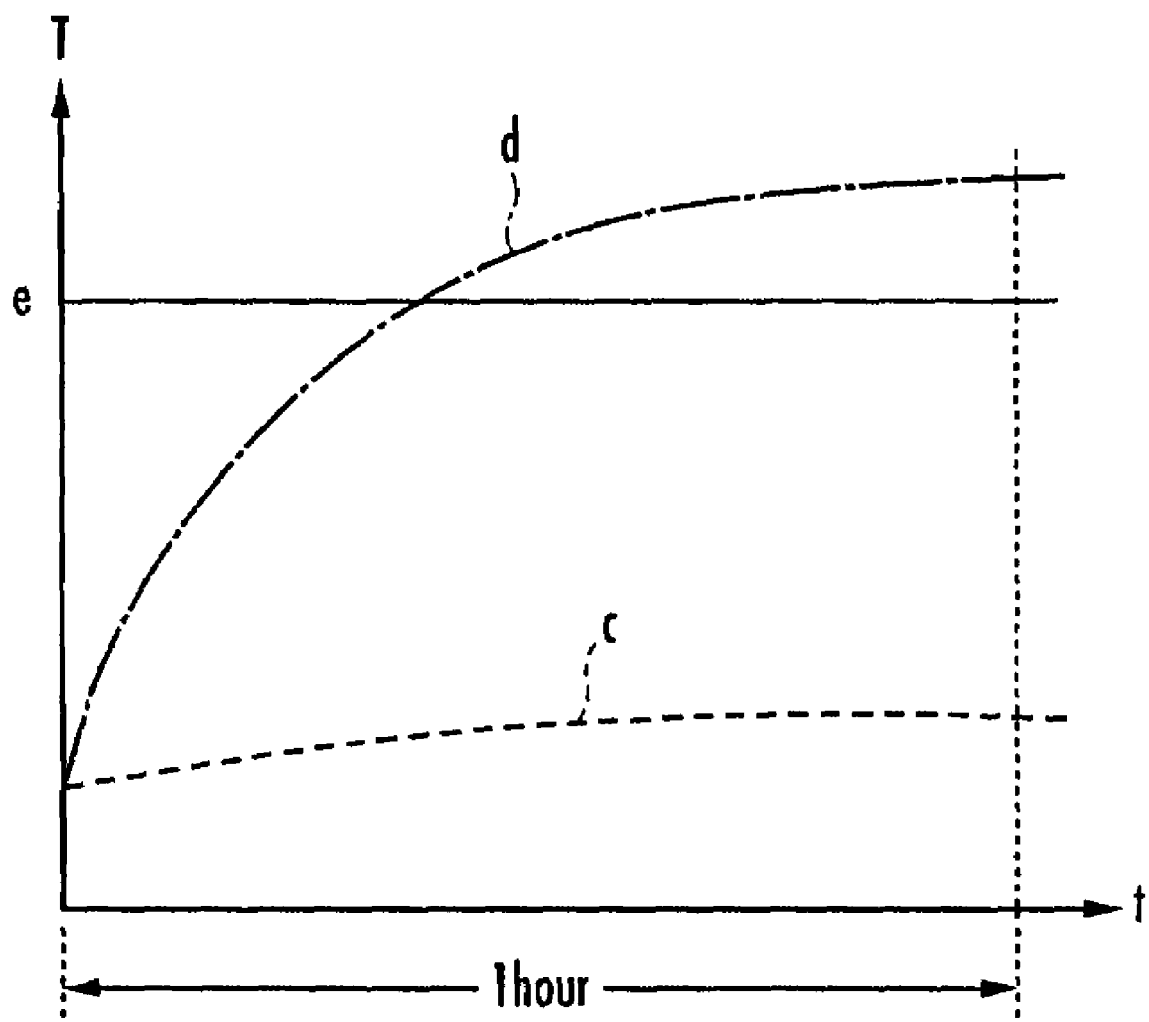
FIG. 5 is a graph for comparison between the heat generated by the alternating-current motor controlled by the motor controlling device shown in FIG. 1 and the heat generated by the alternating-current motor controlled by a conventional motor controlling device.
Figure 6:
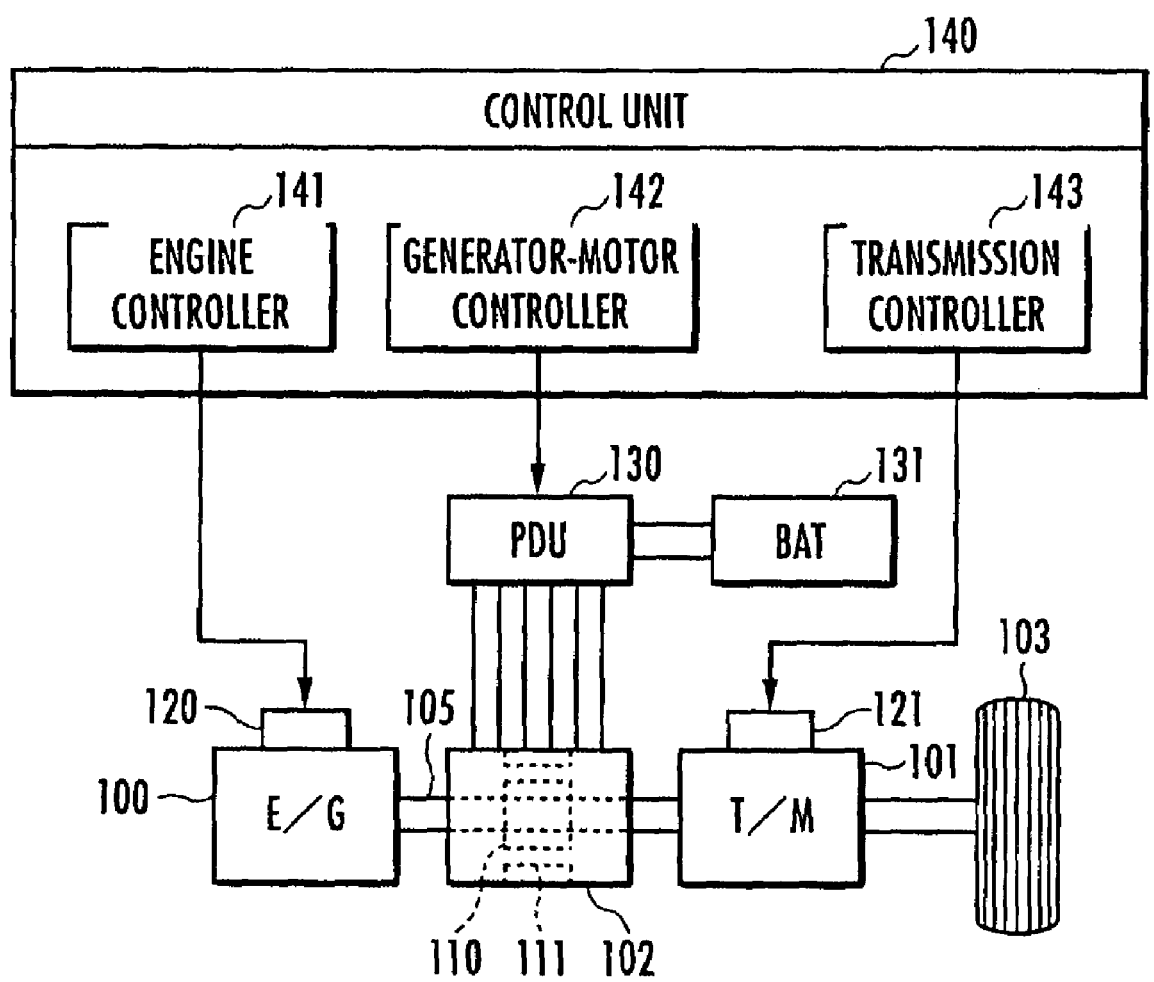
FIG. 6 is a diagram showing an arrangement in which the present invention is applied to a hybrid vehicle.
Figure 7:
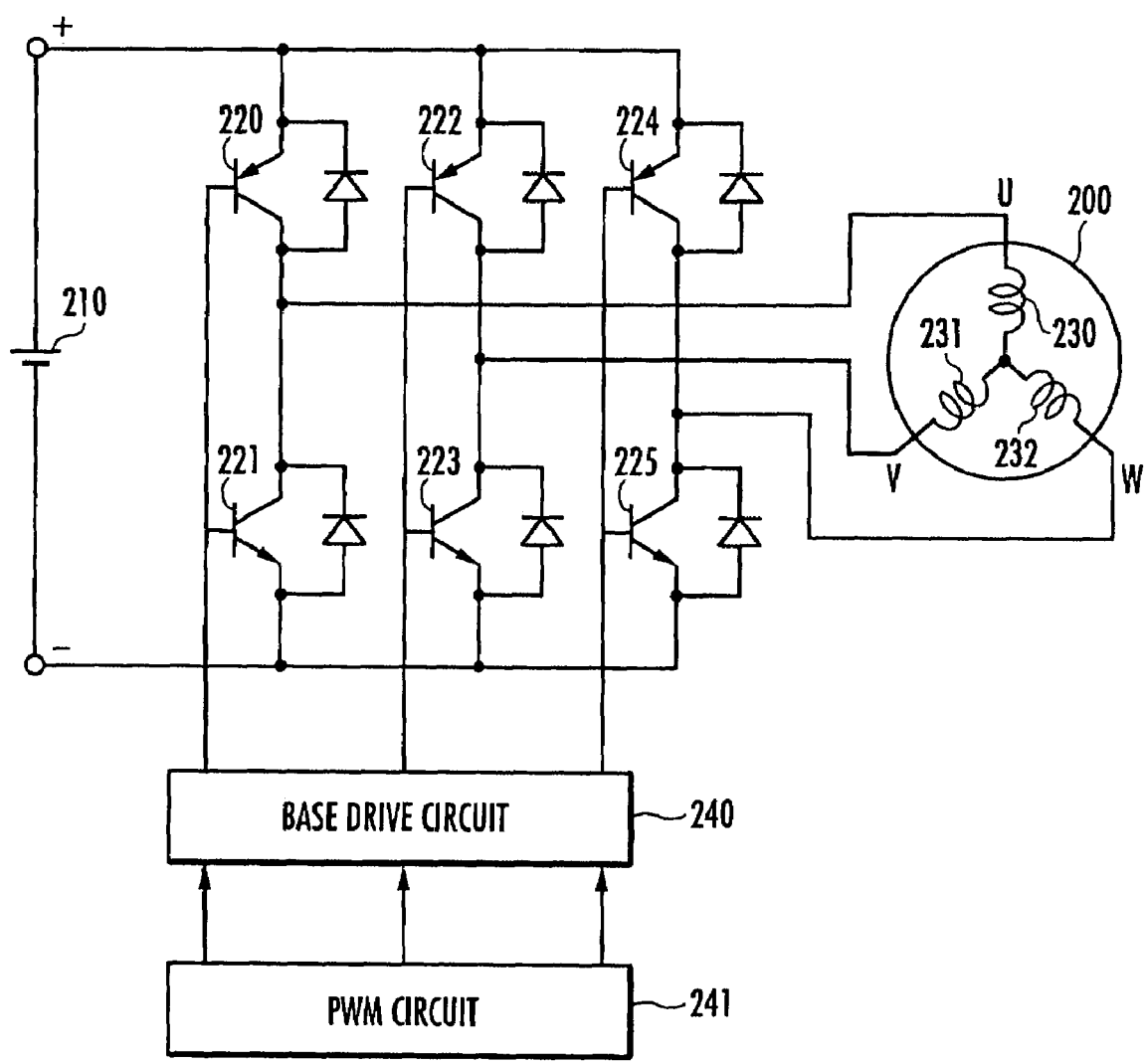
FIG. 7 is a diagram showing a configuration of a conventional motor controlling device.
Figure 8:
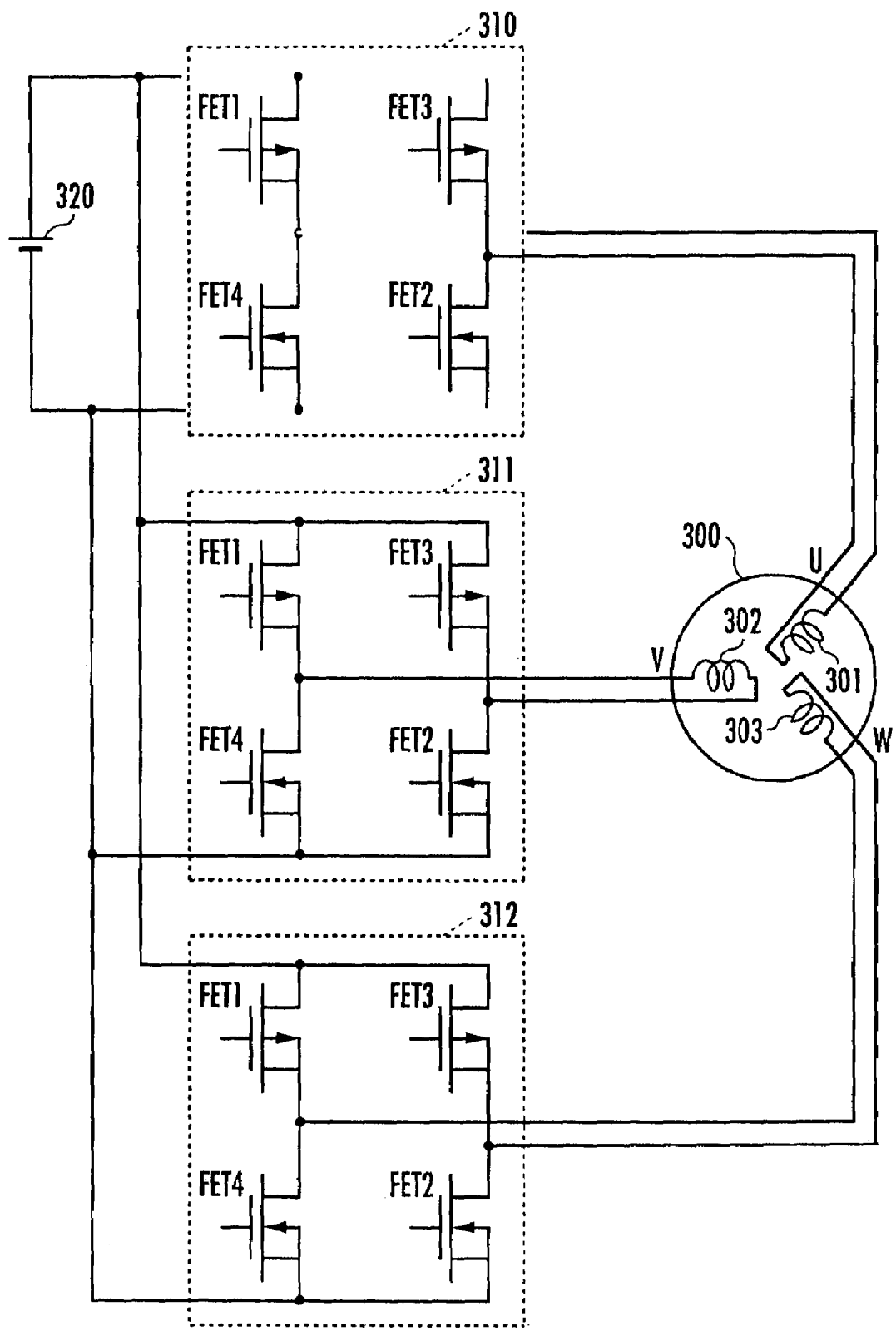
FIG. 8 is a diagram showing a configuration of a conventional motor controlling device.

An embodiment of the present invention will be described with reference to FIGS. 1 to 6. FIG. 1 is a diagram showing a configuration of a motor controlling device according to the present invention, FIG. 2 is a diagram showing a configuration of an H bridge circuit shown in FIG. 1, FIG. 3 shows an appearance of a legged walking robot on which the motor controlling device shown in FIG. 1 and an alternating-current motor are mounted, FIG. 4 includes graphs for illustrating the amount of energization of the alternating-current motor under the PWM control, FIG. 5 is a graph for comparing the heat generated by an alternating-current motor controlled by the motor controlling device shown in FIG. 1 with the heat generated by an alternating-current motor controlled a conventional motor controlling device, and FIG. 6 is a diagram showing a hybrid vehicle to which the present invention is applied.

Referring to FIG. 1, a motor controlling device 1 is designed to control the amount of energization of a motor 2, which is a three-phase DC brushless motor (which corresponds to an alternating-current motor of the present invention), and comprises a control circuit 10 constituted by a CPU and a PLD or the like, a direct-current power supply 11, a first isolator element 13 that electrically isolates control signals for three phases (U phase, V phase and W phase) of the motor 2 output from the control circuit 10 and transmits the isolated control signals to a pre-driver circuit 14, a post-driver circuit 15 that connects and disconnects the direct-current power supply 11 to and from each of the phase armatures of the motor 2 based on a gate drive signal from the pre-driver circuit 14, resistors 30, 31 and 32 for detecting the amount of energization for the phases of the motor 2, a second isolator element 35 that electrically isolates the current detection signals from the resistors 30, 31 and 32 and inputs the signals to an AD converter 36, and an input circuit 41 that performs level conversion or the like of a pulse signal output from an encoder 40 attached to the motor 2 and inputs the pulse signal to the control circuit 10.

To independently connects and disconnects the direct-current power supply 11 to and from each of the phase armatures of the motor 2, the driver circuit 15 has an H bridge circuit 20 connected to the U-phase armature, an H bridge circuit 21 connected to the V-phase armature, and an H bridge circuit 22 connected to the W-phase armature.

Figure 2:
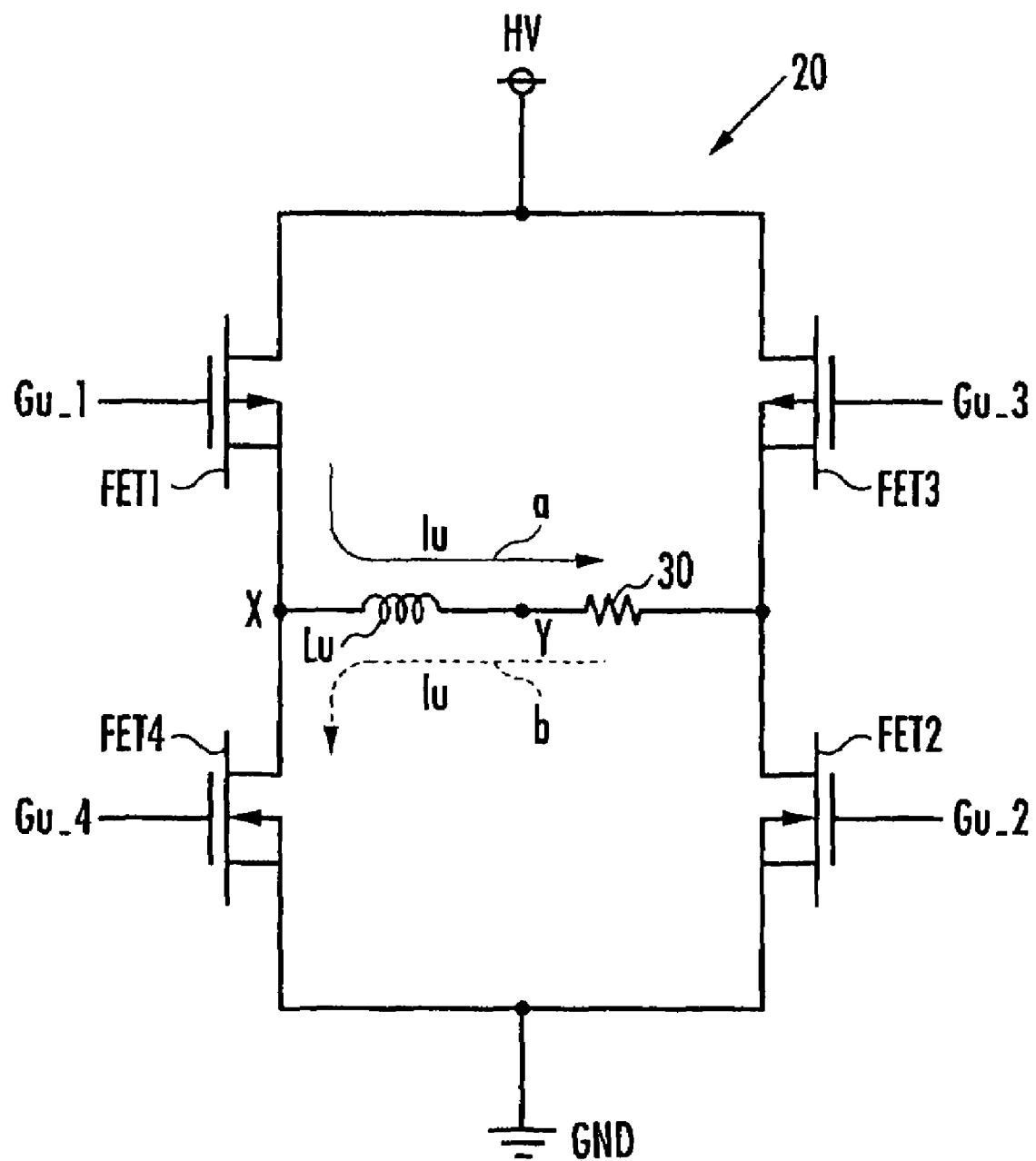
FIG. 2 is a diagram showing a configuration of an H bridge circuit shown in FIG. 1.
Figure 3:
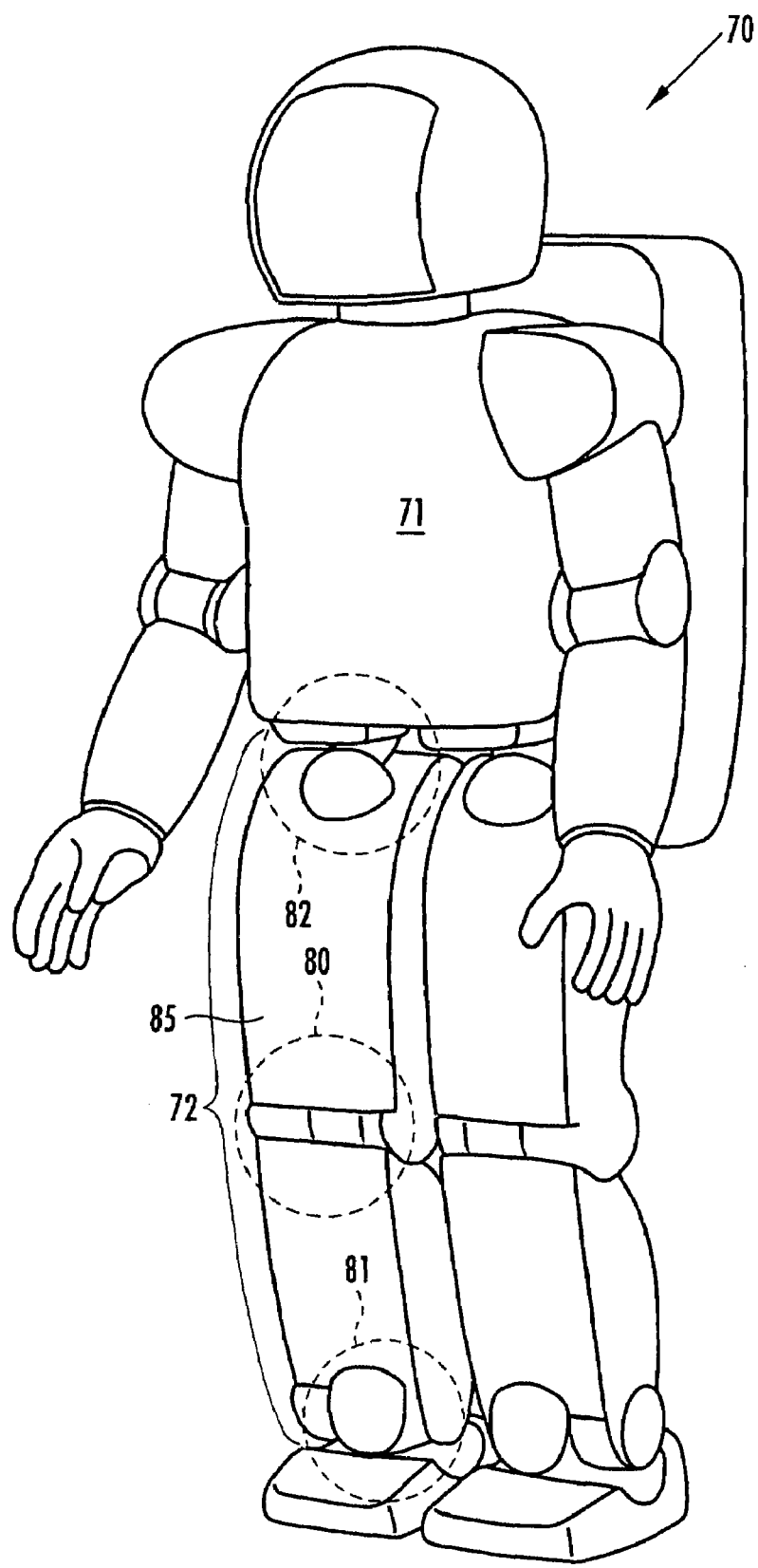
FIG. 3 shows an appearance of a two-legged walking robot on which the motor controlling device shown in FIG. 1 and an alternating-current motor are mounted.

FIG. 2 shows a configuration of the H bridge circuit 20 connected to the U-phase armature Lu. The H bridge circuit 20 comprises an FET1 (which corresponds to a first switching element of the present invention) that connects and disconnects a high potential end (HV) of the direct-current power supply 11 to and from one end (X in the drawing) of the armature Lu, an FET2 (which corresponds to a second switching element of the present invention) that connects and disconnects a low potential end (GND) of the direct-current power supply 11 to and from the other end (Y in the drawing) of the armature Lu, an FET3 (which corresponds to a third switching element of the present invention) that connects and disconnects the high potential end (HV) of the direct-current power supply 11 to and from the other end (Y in the drawing) of the armature Lu, and an FET4 (which corresponds to a fourth switching element of the present invention) that connects and disconnects the low potential end (GND) of the direct-current power supply 11 to and from the one end (X in the drawing) of the armature Lu.

The FET1 to FET4 are turned on or off by gate drive signals Gu_1, Gu_2, Gu_3 and Gu_4 output from the pre-driver circuit 14, respectively. For example, if the FET1 and the FET2 are turned on, and the FET3 and the FET4 are turned off, a current Iu flows in the direction indicated by reference character "a" in the drawing. If the FET3 and the FET4 are turned on, and the FET1 and the FET2 are turned off, the current Iu flows in the direction indicated by reference character "b" in the drawing.

The H bridge circuit 21 connected to the V-phase armature and the H bridge circuit 22 connected to the W-phase armature have the same configuration as the H bridge circuit 20 shown in FIG. 2, and the FETs of the H bridge circuit 21 and the FETs of the H bridge circuit 22 are turned on or off by the gate drive signals output from the pre-driver circuit 14.

Furthermore, referring to FIG. 3, the motor 2 according to this embodiment is to drive the mechanism of a joint part (any of joints 80, 81 and 82 in the drawing) of a leg 72 of a two-legged walking robot 70 (which corresponds to a legged walking robot of the present invention). These joints have to make a sequence of bipedal movements while bearing an upper body 71 incorporating a heavy item, such as a battery, and therefore, the motor 2 is required to output a high torque. The motor 2 is housed in a housing 85, which is made of plastic, of the two-legged walking robot 70 along with the motor control device 1.

In this case, as the output torque increases, the amount of energization of each phase armature of the motor 2 increases, and the heat generated by the armatures of the motor 2 and the FETs of the H bridge circuits 20, 21 and 22 increases. The heat generated by the motor 2 and the FETs tends to be confined in the housing because the plastic housing has poor thermal conductivity. And if the temperature of the armatures of the motor 2 and the FETs of the H bridge circuit 20, 21 and 22 rises, the performance of the motor 2 and the FETs is degraded.

Thus, energization control means 50 (see FIG. 1) in the control circuit 10 performs in the control cycle A the PWM control that involves changing the ratio between the energization control period, in which the armatures are energized by turning on the FET1 and the FET2 and turning off the FET3 and the FET4 or by turning on the FET3 and the FET4 and turning off the FET1 and the FET2, and the non-energization control period, in which the amount of energization of the armatures is made zero by turning on the FET1 and the FET3 and turning off the FET2 and the FET4 or by turning on the FET2 and the FET4 and turning off the FET1 and the FET3, thereby reducing the heat generated by the armatures of the motor 2 and the FETs of the H bridge circuits 20, 21 and 22.

FIG. 4(a) shows a pattern of ON/OFF switching of the FET1 to FET4 of the H bridge circuit 20, 21 and 22 in the case where the amount of energization is zero. In each PWM control cycle A ($t_{10}$-$t_{11}$, $t_{11}$-$t_{12}$, $t_{12}$-$t_{13}$, $t_{13}$-$t_{14}$), the ratio of the energization control period is 0%. Therefore, no heat due to energization is generated by the motor 2 and the H bridge circuits 20, 21 and 22.

Figure 9:
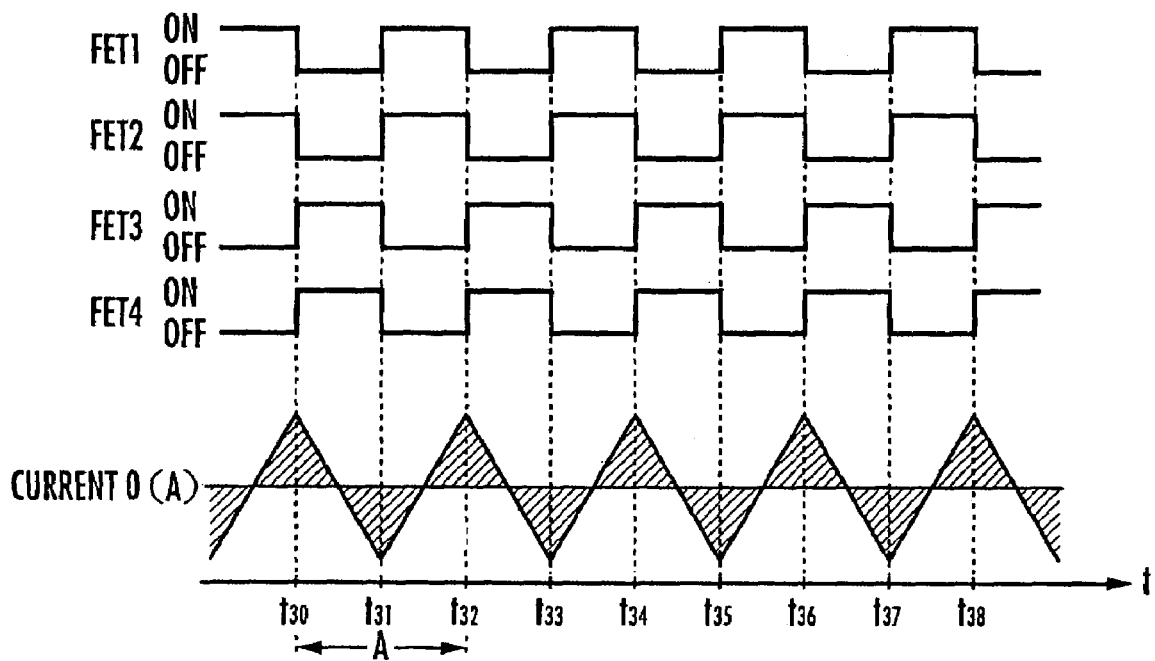
FIG. 9 includes graphs for illustrating the amount of energization of the motor of the conventional motor controlling device.
Figure 9:
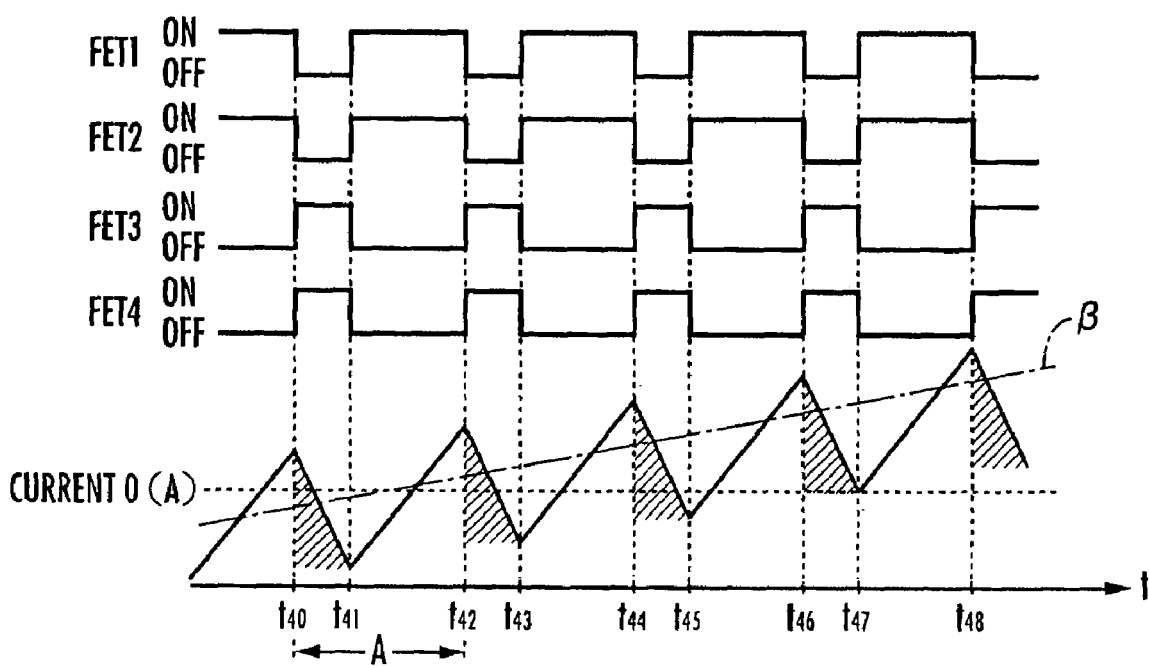

Therefore, compared with the case where the average amount of energization is made zero by balancing the positive and negative currents by the three-phase-balanced energization as described above with reference to FIG. 9(a), the heat generated by the armatures of the motor 2 and the FETs of the H bridge circuits 20, 21 and 22 can be substantially reduced.

FIG. 4(b) shows a pattern of ON/OFF switching of the FET1 to FET4 of the H bridge circuits 20, 21 and 22 in the case where the average amount of energization a to the armatures is gradually increased. The abscissa indicates the time t. In each PWM control cycle A ($t_{20}$-$t_{22}$, $t_{22}$-$t_{24}$, $t_{24}$-$t_{26}$, $t_{26}$-$t_{28}$), an energization control period ($t_{21}$-$t_{22}$, $t_{23}$-$t_{24}$, $t_{25}$-$t_{26}$, $t_{27}$-$t_{28}$) is provided. In this case, the armatures are intermittently energized in periods excluding non-energization control periods ($t_{20}$-$t_{21}$, $t_{22}$-$t_{23}$, $t_{24}$-$t_{25}$, $t_{26}$-$t_{27}$) in which the amount of energization is zero, and in the non-energization control periods, heat generation by the armatures of the alternating-current motor 2 and the FETs of the H bridge circuits 20, 21 and 22 is stopped.

Therefore, compared with the case where the armatures are constantly energized by the three-phase-balanced energization as described above with reference to FIG. 9(b), and the average current $\beta$ is controlled by controlling the ratio between the amounts of positive and negative energization, the heat generated by the motor 2 and the FETs of the H bridge circuits 20, 21 and 22 can be substantially reduced.

In the case where the amount of energization of the motor 2 is decreased, similarly, the armatures are intermittently energized in periods excluding the non-energization control periods, and therefore, the heat generated by the motor 2 and the FETs of the H bridge circuits 20, 21 and 22 can be reduced.

FIG. 5 is a graph for comparison showing the degree of increase in temperature of the three-phase alternating-current motor in the case where the motor operates under a predetermined condition. The ordinate indicates the temperature T, and the abscissa indicates the time t. Reference character "c" in FIG. 5 denotes a temperature change of the motor in the case where the motor controlling device according to this embodiment shown in FIG. 1 controls the amount of energization of the motor by changing the ratio between the energization control period and the non-energization control period as described above. Reference character "d" in FIG. 5 denotes a temperature change of the motor in the case where the conventional motor controlling device controls the amount of energization of the motor by the three-phase-balanced energization. From FIG. 5, it can be seen that the motor controlling device 1 substantially reduces the increase in temperature of the motor.

Reference character "e" in FIG. 5 denotes an upper limit of a safe operating temperature of the motor. For example, the upper limit is 100° C., and the safe operating temperature is determined to fall within a range not exceeding the upper limit. As shown by the reference character "d", in the case of the conventional motor controlling device, the temperature of the motor exceeds the upper limit "e" of the safe operating temperature. However, as shown by the reference character "c", in the case of the motor controlling device according to this embodiment, the temperature of the motor is kept within the range of the safe operating temperature (equal to or lower than the upper limit "e").

Since the heat generated by the motor 2 that drives the mechanism of the joint of the leg 72 and the FETs of the H bridge circuits 20, 21 and 22 is reduced in this way, it is possible to avoid degradation of the performance of the FET of the motor 2 and the H bridge circuits 20, 21 and 22 due to the heat generated and thus degradation of the walking performance of the two-legged walking robot 70.

FIG. 6 shows an arrangement in which the motor controlling device 1 controls a generator motor 102 (including the function of the alternating-current motor of the present invention) mounted on a hybrid vehicle. The generator motor 102 is disposed between an engine 100 and a transmission 101. A rotor 110 of the generator motor 102 is coupled to an output shaft 105 of the engine 100, and the output torque of the engine 100 and the generator motor 102 is transmitted from the output shaft 105 to a drive wheel 103 via the transmission 101.

A control unit 140 that controls the whole operation of the vehicle comprises an engine controller 141 that controls the operation of the engine 100 via an engine drive unit 120, a generator-motor controller 142 that controls the operation of the generator motor 102 via a power drive unit (PDU) 130, and a transmission controller 143 that controls the operation of the transmission 101 via a transmission actuator 121 (constituted by a hydraulic circuit, for example).

The PDU 130 includes the pre-driver circuit 14 and the post-driver circuit 15 shown in FIG. 1 and has a capability of connecting and disconnecting a battery 131 (which corresponds to a direct-current power supply of the present invention) to and from each of the phase armatures of the generator motor 102. The generator-motor controller 142 has the capability of the energization control means 50 shown in FIG. 1 and outputs, to the PDU 130, a gate drive signal for changing the ratio between the energization control period and the non-energization control period in the control cycle A described above. The capabilities of the generator-motor controller 142 and the PDU 130 provide the motor controlling device according to the present invention.

In the case where the generator motor 102 is disposed between the engine 100 and the transmission 101 as shown in FIG. 6, the generator motor 102 is heated by the heat generated by the engine 100. In addition, circulation of the air around the generator motor 102 is prevented by the engine 100 and the transmission 101 located close to the generator motor 102. In addition, since the rotor 110 of the generator motor 102 is coupled to the output shaft 105 of the engine 100, the heat generated by the engine 100 is transferred to the rotor 110 via the output shaft 105, and the generator motor 102 is also heated from the inside. Thus, the temperature of the generator motor 102 tends to increase.

Thus, the energization control means 50 is provided, and the amount of energization of the generator motor 102 is controlled by the PWM control that involves changing the ratio between the energization control period and the non-energization control period in the control cycle A described above, thereby reducing the heat generated by armatures 111 of the generator motor 102. As a result, the performance degradation of the hybrid vehicle due to the temperature increase of the generator motor 102 can be suppressed.

The safe operating temperature of the generator motor 102 is determined taking into account the effect of the increase of the temperature of the engine 100 and the transmission 101. In addition, the energization control means 50 described above controls the amount of energization to reduce the heat generated by the armatures 111 of the generator motor 102. As a result, the temperature of the generator motor 102 can be prevented from exceeding the upper limit of the safe operating temperature even if the generator motor 102 is influenced by the heat radiation from the engine 100 and the transmission 101.

What is claimed is:

1. A motor controlling device comprising:
a direct-current power supply;
N H bridge circuits for N phase armatures of an alternating-current motor, wherein each H bridge circuit is provided between the direct-current power supply and each phase armature of the alternating-current motor, and comprises
a first switching element configured to connect and disconnect a high potential end of the direct-current power supply to and from one end of the armature,
a second switching element configured to connect and disconnect a low potential end of the direct-current power supply to and from the other end of the armature,
a third switching element configured to connect and disconnect the high potential end of the direct-current power supply to and from said other end of the armature, and
a fourth switching element configured to connect and disconnect the low potential end of the direct-current power supply to and from said one end of the armature; and
an energization control unit configured to control the operation of said first to fourth switching elements of each H bridge circuit, thereby controlling the amount of energization of each armature,
wherein said energization control unit is configured to control the amount of energization of each armature by a PWM control that involves changing a ratio, in a predetermined control cycle, between an energization control period, in which said first and second switching elements are turned on and said third and fourth switching elements are turned off in the associated H bridge circuit, or said third and fourth switching element are turned on and said first and second switching elements are turned off in the associated H bridge circuit, and a non-energization control period, in which said first and third switching elements are turned on and said second and fourth switching elements are turned off in the associated H bridge circuit, or said second and fourth switching elements are turned on and said first and third switching elements are turned off in the associated H bridge circuit, and
wherein said alternating-current motor is a joint motor for a leg of a legged walking robot, and the motor controlling device is housed in a housing of the legged walking robot along with the joint motor.

2. A motor controlling device comprising:
a direct-current power supply;
N H bridge circuits for N phase armatures of an alternating-current motor, wherein each H bridge circuit is provided between the direct-current power supply and each phase armature of the alternating-current motor, and comprises
a first switching element configured to connect and disconnect a high potential end of the direct-current power supply to and from one end of the armature, a second switching element configured to connect and disconnect a low potential end of the direct-current power supply to and from the other end of the armature, a third switching element configured to connect and disconnect the high potential end of the direct-current power supply to and from said other end of the armature, and a fourth switching element configured to connect and disconnect the low potential end of the direct-current power supply to and from said one end of the armature; and an energization control unit configured to control the operation of said first to fourth switching elements of each H bridge circuit, thereby controlling the amount of energization of each armature, wherein said energization control unit is configured to control the amount of energization of each armature by a PWM control that involves changing a ratio, in a predetermined control cycle, between an energization control period, in which said first and second switching elements are turned on and said third and fourth switching elements are turned off in the associated H bridge circuit, or said third and fourth switching elements are turned on and said first and second switching elements are turned off in the associated H bridge circuit, and a non-energization control period, in which said first and third switching elements are turned on and said second and fourth switching elements are turned off in the associated H bridge circuit, or said second and fourth switching elements are turned on and said first and third switching elements are turned off in the associated H bridge circuit, wherein the motor controlling device is provided in a hybrid vehicle whose driving force is produced by an engine and said alternating-current motor, and the alternating-current motor is disposed on an output shaft of the engine at a position between the engine and a transmission and has a rotor coupled to the output shaft of the engine.

* * * * *